United States Patent [19]

Meyerhoff

[11] Patent Number: 4,530,854

[45] Date of Patent: Jul. 23, 1985

[54] FOCUSING DEVICE FOR EXTERNAL FLASHING OF GETTERS

[75] Inventor: Hans P. Meyerhoff, Fridley, Minn.

[73] Assignee: Honeywell Inc., Minneapolis, Minn.

[21] Appl. No.: 422,335

[22] Filed: Sep. 23, 1982

[51] Int. Cl.³ .............................. H01S 3/08; H01J 9/39
[52] U.S. Cl. .................................... 427/162; 427/124; 427/250; 445/57
[58] Field of Search ........................ 445/40, 41, 43, 55, 445/57, 13, 14; 427/250, 124, 162

[56] References Cited

U.S. PATENT DOCUMENTS

| 2,752,519 | 6/1956 | Ruedy | 445/14 X |
| 3,084,010 | 4/1963 | Turnbull | 445/14 |
| 3,486,217 | 12/1969 | Congleton et al. | 427/250 |
| 3,572,672 | 3/1971 | Harel | 427/250 X |
| 3,644,101 | 2/1972 | Takashio et al. | 427/250 X |

Primary Examiner—Kenneth J. Ramsey
Attorney, Agent, or Firm—Laurence J. Marhoefer

[57] ABSTRACT

A method of introducing getter material in which a beam of getter atoms formed outside a cavity is directed into the cavity.

3 Claims, 2 Drawing Figures

FOCUSING DEVICE FOR EXTERNAL FLASHING OF GETTERS

BACKGROUND OF THE INVENTION

This invention relates to an improved method for introducing getter material into an evacuated cavity, and more particularly to a method especially useful with ring laser gyros.

Alkaline earth materials, commonly barium, are widely used as getters to scavenge residual gases in high vacuum devices. Because of the extreme reactiveness of these materials with air, commercially available getter material are usually alloyed with aluminum or other materials in order to reduce their reactiveness.

In ring laser gyros of which applicant is aware, a getter assembly consisting of a snap ring welded to a getter pan containing the getter material is clamped inside the gyro. The getter material is flashed and the gyro closed off at its pinch tube, leaving the getter assembly inside the gyro. This system has several disadvantages. Particles shed from the delivery system due to shock, vibration, and/or temperature variations, can contaminate the gyro and reduce its useful life. Further, a certain amount of contaminated gas is emitted from the getter material just before it flashes. Also, some contaminating particles may be rubbed off during insertion of the getter delivery system into the gyro.

An object of this invention is an improved method for depositing getter material into an evacuated cavity of a ring laser gyro or other similar executed cavity.

Briefly, this invention contemplates the provision of an improved method in which getter material is flashed outside of the evacuated space. Getter atoms are formed into a beam directed toward a predetermined region within the device itself.

DESCRIPTION OF THE INVENTION

Figures 1, 2:
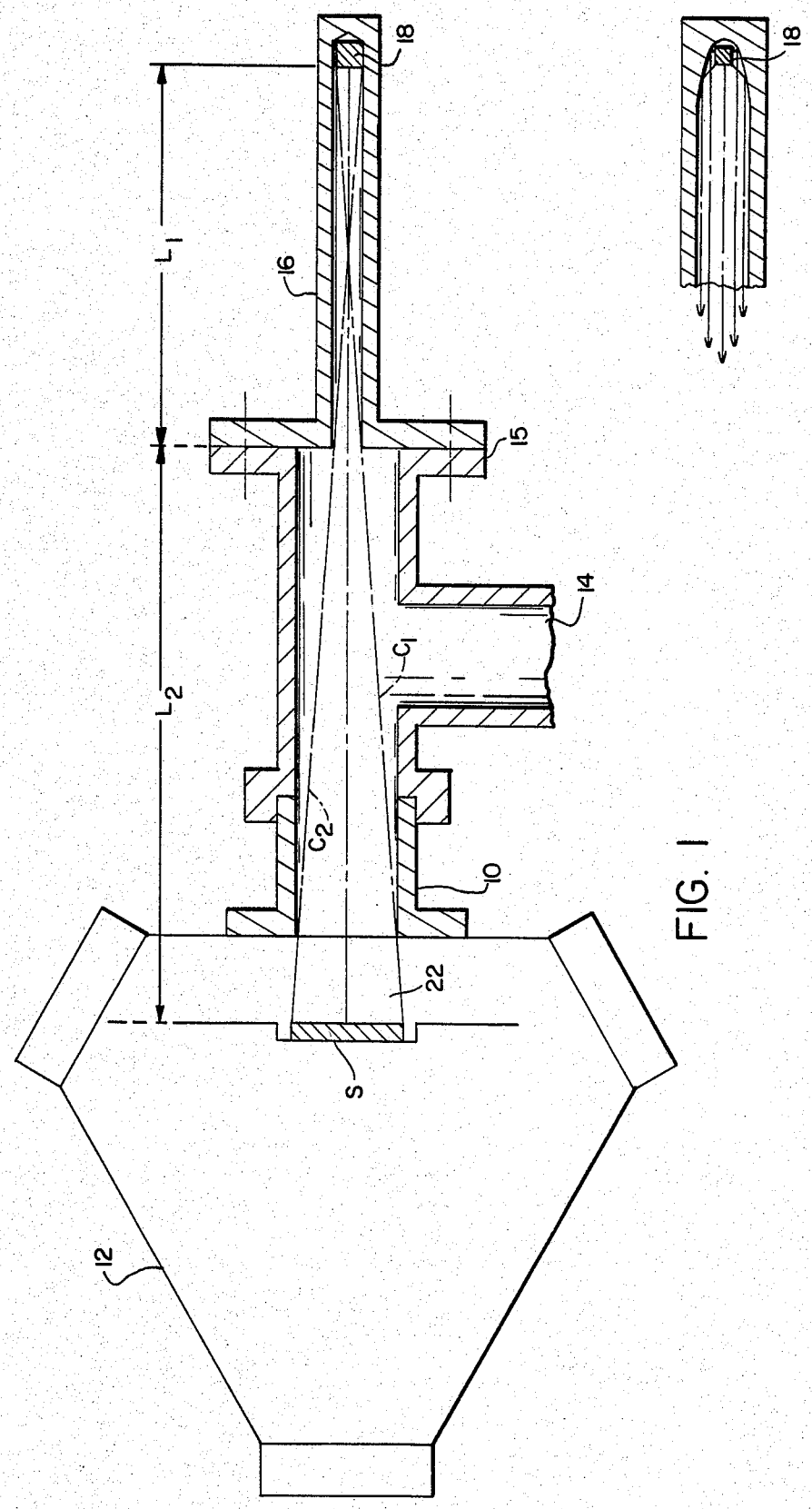
FIG. 1 is a schematic drawing of one embodiment of the invention.
FIG. 2 is a fragmentary schematic drawing illustrating another embodiment of the invention.

Referring now to FIG. 1 of the drawings, a pinch tube 10 connects internal cavities of a ring laser gyro 12 via a "T" connector to a vacuum pump (not shown). The ring laser gyro 12 is of a solid block type such as is shown in U.S. Pat. No. 3,390,606. One end of a getter beam forming tube 16 is connected to the connector 15 with a getter pellet 18 secured in its other end. The tube 16 is preferably made of stainless steel.

The length L1 of the beam forming tube 16, plus the length L2 from the end of the focusing device to a target spot S (L2 includes connector 15, pinch tube 10, and chamber 22 in the gyro block 12) along with the diameter of the tube 16 determine the size of the getter deposition region. The parameters of this relationship can be determined easily by drawing the extreme rays C2 and C1.

In operation, the chambers of the laser gyro 12 are evacuated by the vacuum pump (not shown) coupled to the vacuum connector 14. The entire assembly is maintained at or below room temperature except for the region around the getter pellet 18. The getter pellet 18 is heated by RF energy or other suitable heat source such as an open flame. Heat causes the getter pellet to flash with those rare earth atoms directed more or less parallel to the longitudinal axes of the focus tube depositing on the target spot S. Molecules leaving the getter pellet at an angle obligue to the longitudinal center line deposit on the interior wall of the relatively cool focusing tube, thus controlling the size of the target region S. It should also be noted that this arrangement reduces the back pressure on the getter pellet during flashing.

After the getter material has deposited on the target spot, the laser can be filled with a suitable lasing gas and the assembly sealed via the pinch tube 10. If a getter surface larger than the region S is needed (to increase the vacuum life of the gyro, for example) excess getter material can be deposited, and then can be redistributed over larger interior surface by heating the region S to the flashing temperature of the getter material using a laser or an infrared radiation heat source.

FIG. 2 shows an embodiment of the invention in which the end of the tube 16 in which the getter pellet 18 is located has a parabolic interior surface so that the getter atoms in the heated region are reflected along the axis of the tube, thus increasing the yield of getter material deposited on the target spot S.

Thus it will be appreciated that the objects of the invention have been achieved. Since there is no need with this new system to support the getter material within the evacuated space a source of possible contamination is eliminated. In addition, it should be noted, that the passivating alloys will not carry over into the evacuated space.

Those skilled in the art will recognize that only preferred embodiments of the present invention are disclosed herein and that the embodiment may be altered and modified without departing from the true spirit and scope of the invention as defined in the accompanying claims.

What is claimed is:

1. A method of introducing getter material into a cavity in a ring laser gyro comprising steps; evacuating said cavity flashing the getter material outside the evacuated cavity;

forming a beam of getter atoms from said flashed getter material directed toward a predetermined region in said evacuated cavity;

depositing said getter atoms on said region.

2. The method of introducing getter material as in claim 1 including the further step of reflashing said getter material deposited on said region.

3. A method of introducing getter material into a cavity comprising steps:

evacuating said cavity;

flashing the getter material outside of said evacuated cavity;

forming a beam of getter atoms from said flashed getter material;

directing said beam toward a predetermined region in said evacuated cavity;

depositing said getter atoms on said region.

* * * * *